United States Patent

Murto

[11] Patent Number: 5,991,407
[45] Date of Patent: Nov. 23, 1999

[54] SUBSCRIBER AUTHENTICATION IN A MOBILE COMMUNICATIONS SYSTEM

[75] Inventor: Juhani Murto, Coppel, Tex.

[73] Assignee: Nokia Telecommunications Oy, Espoo, Finland

[21] Appl. No.: 08/544,199

[22] Filed: Oct. 17, 1995

[51] Int. Cl.$^6$ .............................. H04K 1/00; H04L 9/00; H04Q 7/20

[52] U.S. Cl. ................. 380/23; 380/25; 380/49; 455/410; 455/411

[58] Field of Search .................. 380/4, 23, 25, 380/49; 340/825.31, 825.34; 379/58–63; 455/53.1, 54.1, 54.2, 33.1, 56.1, 432, 433, 435, 410, 411

[56] References Cited

U.S. PATENT DOCUMENTS

| | | | |
|---|---|---|---|
| 5,319,710 | 6/1994 | Atalla et al. . | |
| 5,400,390 | 3/1995 | Salin | 379/59 |
| 5,513,245 | 4/1996 | Mizikovsky et al. . | |
| 5,551,073 | 8/1996 | Sammarco | 455/89 |
| 5,557,676 | 9/1996 | Naslund | 380/23 |
| 5,629,974 | 5/1997 | Rajala et al. | 455/466 |
| 5,642,401 | 6/1997 | Yahagi | 379/58 |

FOREIGN PATENT DOCUMENTS

0 675 615 A1  10/1995  European Pat. Off. .

OTHER PUBLICATIONS

"Applied Cryptography" by Bruce Schneier @ 1994 see p. 158.

*Primary Examiner*—Tod R Swann
*Assistant Examiner*—Hrayr A. Sayadian
*Attorney, Agent, or Firm*—Pillsbury Madison & Sutro LLP

[57] ABSTRACT

An authentication procedure in a Global System for Mobile Communications (GSM)-based mobile communications system relies on a challenge and response principle. A 32-bit Signed Response (SRES) parameter is calculated by an A3 algorithm from a 128-bit random number (RAND) and a 128-bit authentication key $K_i$ in a mobile station, and in an authentication center, and the SRES values are compared. A Cellular Authentication and Voice Encryption (CAVE) algorithm having a 152-bit input parameter and a 18-bit output parameter is employed as the A3 algorithm. Parameter adaptation functions are provided between the input parameter of the CAVE algorithm and the GSM-type input parameters, namely the random number RAND and the authentication key $K_i$, as well as between the output parameter of the CAVE algorithm and the GSM output parameter, namely the signed response SRES.

3 Claims, 8 Drawing Sheets

SUBSCRIBER AUTHENTICATION IN A MOBILE COMMUNICATIONS SYSTEM

FIELD OF THE INVENTION

The present invention relates to security functions in mobile communications networks, and particularly to a subscriber authentication in mobile communications networks.

BACKGROUND OF THE INVENTION

In all telecommunication networks both the users and the network operator have to be protected against undesirable intrusion of third parties as far as possible. Thus several kinds of security functions are needed in the networks. The major aspects of the network security are 1) the protection of the information that the network conveys; and 2) authentication and access control of the users of the network. The major security mechanism for the protection of information is, and is likely to remain, some form of encryption. Authentication is a means of trying to ensure that information comes from the source it is claimed to come from. It is typically based on passwords and keys. Access rights are assigned in terms of the ability to send and/or receive via the transmission medium. Also access mechanisms typically depend on some form of password or key.

Due to the use of radio communications for transmissions to the mobile subscribers, radio accessed networks, such as Public Land Mobile Networks (PLMN), are particularly sensitive to misuse of their resources by unauthorized users and eavesdropping on the information which is exchanged on the radio path. This comes from the possibility to listen to and transmit radio signals from anywhere, without tampering with a user's or an operator's equipment. It can be seen that PLMNs have a need for a higher level of security than traditional telecommunication networks.

The pan-European digital cellular radion which is known as Global System for Mobile Communications (GSM) contains a highly secure authentication system. It is based on so-called challenge and response principle. At subscription time, a secret number called a Subscbiber Authentication Key ($K_i$) is allocated to the subscriber together with an International Mobile Subscriber Identity (IMSI). $K_i$ is stored in a special purpose element of the GSM network, called an Authentication Center (AUC) which is associated with or linked to a Home Location Register (HLR) of the subscriber. AUC contains also a ciphering algorithm, called A8, and an authentication algorithm, called A3, as well as a generation of random numbers (RAND). A parameter called a ciphering key ($K_c$) is generated from $K_i$ and RAND by the algorithm A8. Similarly, a parameter called a Signed Response (SRES) is generated from $K_i$ and RAND by the algorithm A3. The three parameters RAND, $K_c$ and SRES make up a "triplet", specific to a subsriber, to be used for further authentication and ciphering. In order to avoid calculation and transfer of triplet every time it is needed, several triplets are calculated in advance for each subscriber by AUC/HLR and on request delivered to a Visitor Location Register (VLR) and a Mobile Services Switching Center (MSC) there they are stored. MSC/VLR will always have at least one triplet unused for each of its visitor subscribers. Tight security requires that a triplet be used only once, for one communication, and then be destroyed. When a subscriber has used all it's available triplets, the AUC/HLR is then requested to calculate and send back a new series.

A GSM mobile station is split into two parts, one which contains the hardware and software specific to the radio interface, the mobile equipment, and and another which contains the subscriber specific data: the Subscriber Identity Module, or SIM. Each subscriber has a SIM, typically in a form of a smart card, which takes responsibility for most of the security functions at the mobile station side. It stores $K_i$, the authentication algorithm A3 and the ciphering algorithm A8, as well as the ciphering key $K_c$ received from the network side.

During authentication, the VLR/MSC sends the random number RAND (and also $K_c$) of a respective triplet to the mobile station. The mobile station, more particularly its SIM part, processes RAND using the authentication algorithm A3 and the authentication key $K_i$, and returns the resulting Signed Response (SRES) to the VLR/MSC. This SRES is checked against the SRES of the triplet given by the HLR to the subscriber. If the two SRESes are equal to each other, the access is allowed, and otherwise denied.

All the security mechanisms in the GSM rely on secrecy of the authentication key $K_i$. $K_i$ is never transmitted and never leaves the AUC/HLR. Also, the SIM protects completely the $K_i$ against reading. Because the mathematical algorithm A3 works only one way (it is a so-called one-way trap door function) it is impossible to derive the key $K_i$ from the RAND-SRES pairs transmitted. Further, the authentication algorithm A3 itself is a secret algorithm, it cannot be found even in the GSM specifications. The specifications only require that computation of a $K_i$ knowing the RAND and the SRES should be as complex as possible. This level of complexity determines which security level has been achieved. Beyond this requirement, the only constraint imposed on A3 is the size of the input parameter (RAND is 128 bits long) and the size of the output parameter (SRES must be 32 bits long). $K_i$ can be of any format and length when stored in AUC/HLR, only if $K_i$ would be transported in the network it would be constrained to a maximum length of 128 bits. In fact, the design choices of GSM, both in the mobile station and in the infrastructure, make it possible for the operators to choose the A3 applicable to their own subcsribers independently from other operators.

In the U.S.A, a digital cellular system called Personal Communications System (PCS) is under development. The US PCS is based on the GSM system to a great extent, especially as regards network architecture and protocols, including the security functions. However, some minor modifications are being made in various parts of the system. One potential modification is that the authentication algorithm A3 used in the GSM system be replaced by the Cellular Authentication and Voice Encryption (CAVE) algorithm in the US PCS, since the CAVE algorithm has been developed in the USA and is already used in analog Advances Mobile Phone Service (AMPS) networks. The CAVE algorithm which might be suitable to be used for authentication in the PCS system would have an 152-bit input parameter consisting of a number of concanated information fields, and a 18-bit output parameter, whereas the A3 algorithm in the GSM has a 128-bit $K_i$ and RAND parameters as input parameters and a 32-bit SRES parameter as an output parameter. Therefore, replacement of A3 with the CAVE algorithm in a GSM based mobile communications system is not possible without further modifications. However, modifications may easily affect in various protocols, functions, messages and data structures throughout the system and thereby make the CAVE algorithm technically and economically unattractive. A further disadvantage is that the compability with the GSM system will be lost, and consequently, for example, SIM-roaming between the GSM and the US PCS systems will not be possible.

SUMMARY OF THE INVENTION

An object of the invention is to enable the use of the CAVE algorithm as the A3 algorithm in the GSM system or in a GSM-based mobile communications network without incurring modifications in GSM authentication parameters.

A further object of the invention is to enable the use of the CAVE algorithm as the A3 algorithm in the GSM system or in a GSM-based mobile communications network without modifications in the GSM triplet data structure.

A still further object of the invention is to enable the use of the CAVE algorithm as the A3 algorithm in the GSM system or in a GSM-based mobile communications network but otherwise retain the security functions of the standard GSM system.

One aspect of the invention is an authentication method for a mobile communications network, comprising the steps of:

utilizing an authentication procedure designed to be used with a first authentication response-calculation method, utilizing a second authentication response calculation method instead of the first authentication response calculation method, providing an authentication key compatible with the first authentication response-calculation method but incompatible with the second authentication response-calculation method, for each subscriber of the mobile communications network, generating a random number compatible with the first authentication response-calculation method but incompatible with the second authentication response-calculation method, deriving an input parameter compatible with the second authentication response-calculation method from the authetication key and the random number, calculating by the second autentication response-calculation method an authentication response incompatible with an authentication response format of the authentication procedure utilized in the mobile communications network, modifying the authentication response into a format compatible with the authentication response format of the authentication procedure, and transferring and storing the authentication response in the mobile communications network in the format compatible with authentication procedure.

According to the invention parameter adaptation functions are provided between the input parameter of the CAVE algorithm and the GSM-type input parameters, namely the random number RAND and the authentication key $K_i$, as well as between the output parameter of the CAVE algorithm and the GSM output parameter, namely the signed response SRES. As a result, no modifications are needed in the CAVE algorithm itself, nor it is necessary to depart from the GSM type security functions otherwise than in the calculation of SRES in the authentication center AUC/HLR and in the mobile station MS.

BRIEF DESCRIPTION OF THE DRAWINGS

The preferred embodiments of the invention will be described with reference to the attached drawings, wherein.

PREFERRED EMBODIMENTS OF THE INVENTION

The present invention can be applied in the Pan-European digital mobile radio system GSM or in any GSM based mobile radio system, such as the DCS1800 digital communication system and the U.S. digital cellular system called the Personal Communication System (PCS). Although the preferred embodiment of the invention will be described as an application in a standard GSM system in the following, the primary field of the application will apparently be the PCS system in the U.S.A. The structure and operation of the GSM system are well known to one skilled in the art and are defined in the GSM specifications issued by the European Telecommunications Standards Institute (ETSI). A reference is also made to the GSM system for a mobile communications, M. Mouly & M. Pautet, Palaiseau, France, 1992; ISBN2-9507190-0-7.

Figure 1:
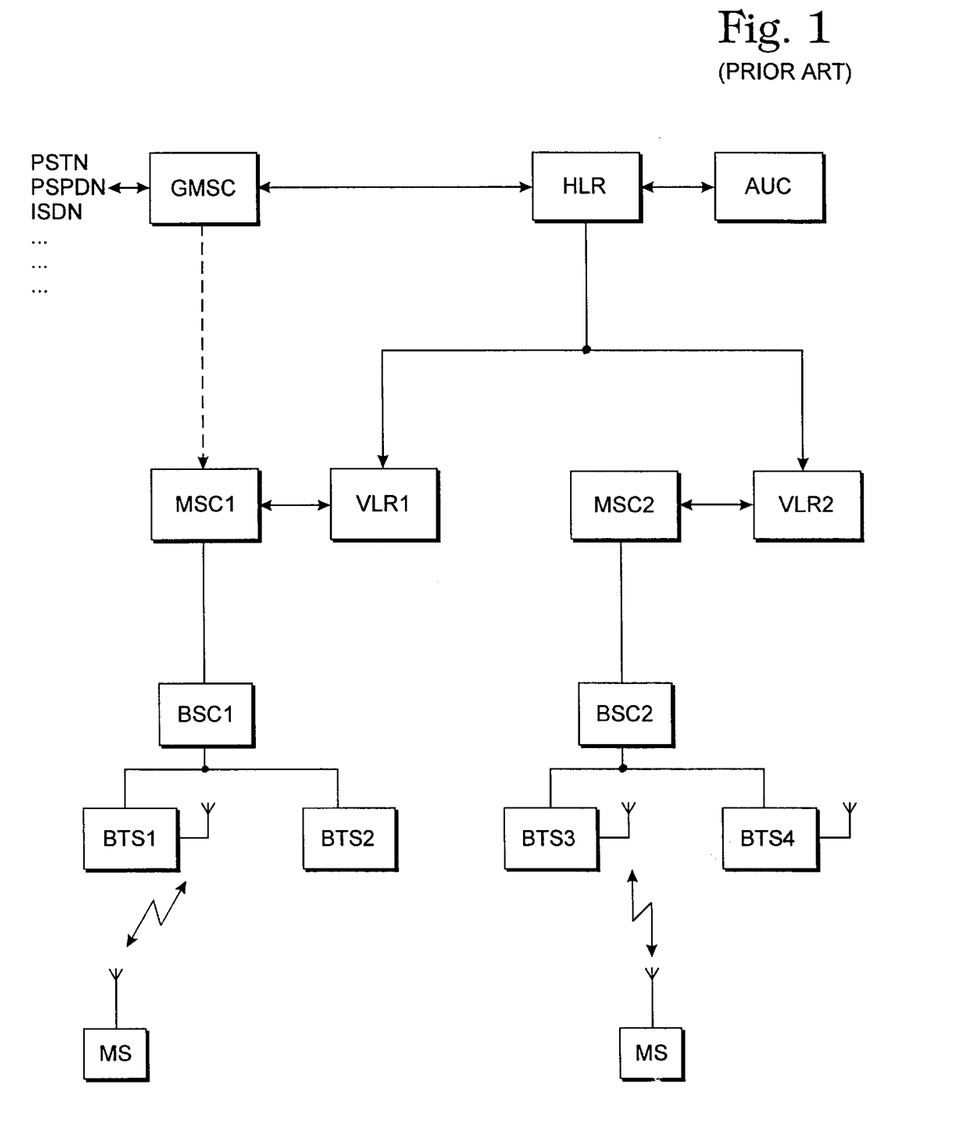
FIG. 1 is a block diagram illustrating a GSM-based cellular mobile radio system.

The basic structure of the GSM system is shown in FIG. 1.

The GSM structure consists of two parts: the base station subsystem (BSS), and the network subsystem (NSS). The BSS and the mobile stations (MS) communicate via radio connections. In the BSS, each cell is served by a base transceiver station (BTS). A group of BTSes is connected to a base station controller (BSC) whose function is to manage the radio frequencies and channels used by the BTS. The BSCs are connected to a mobile switching centre (MSC). The MSC is used for switching calls involving at least one mobile station MS. Certain MSCs are connected to other telecommunication networks such as the public switched telephone network (PSTN), and contain gateway functions for handling calls to and from these networks. These MSCs are known as gateway MSCs (GMSCs).

There are two main types of database concerned with the routing of calls. There is a home location register (HLR) that stores subscriber data on all the subscribers of the network on a permanent or semipermanent basis, including information on the services to which the subscriber may have access, and the current location of the subscriber. The second type of register is the visitor location register (VLR). The VLR is attached generally to one MSC, but it may, however, serve several MSCs. It is common practice that the VLR is integrated into the MSC. This integrated network element is known as a visitor MSC (VMSC). Whenever a mobile station MS is active (logged on and able to make or receive a call) most of the mobile subscriber data about a mobile station MS that is held in the HLR is downloaded (copied) into the VLR of the MSC in whose area the mobile station MS is.

As noted above, in the mobile radio service, great care must by taken to prevent unauthorized call attempts and intrusion or listening-in by third parties. Protection mechanisms in GSM system authenticate the calling or called mobile station, and use a ciphering key to encode speech and data on the traffic channel.

The prior art mechanism according to the GSM specifications for providing authentication and ciphering keys will now be described with reference to FIGS. 2, 3, 4 and 5.

Figure 2:
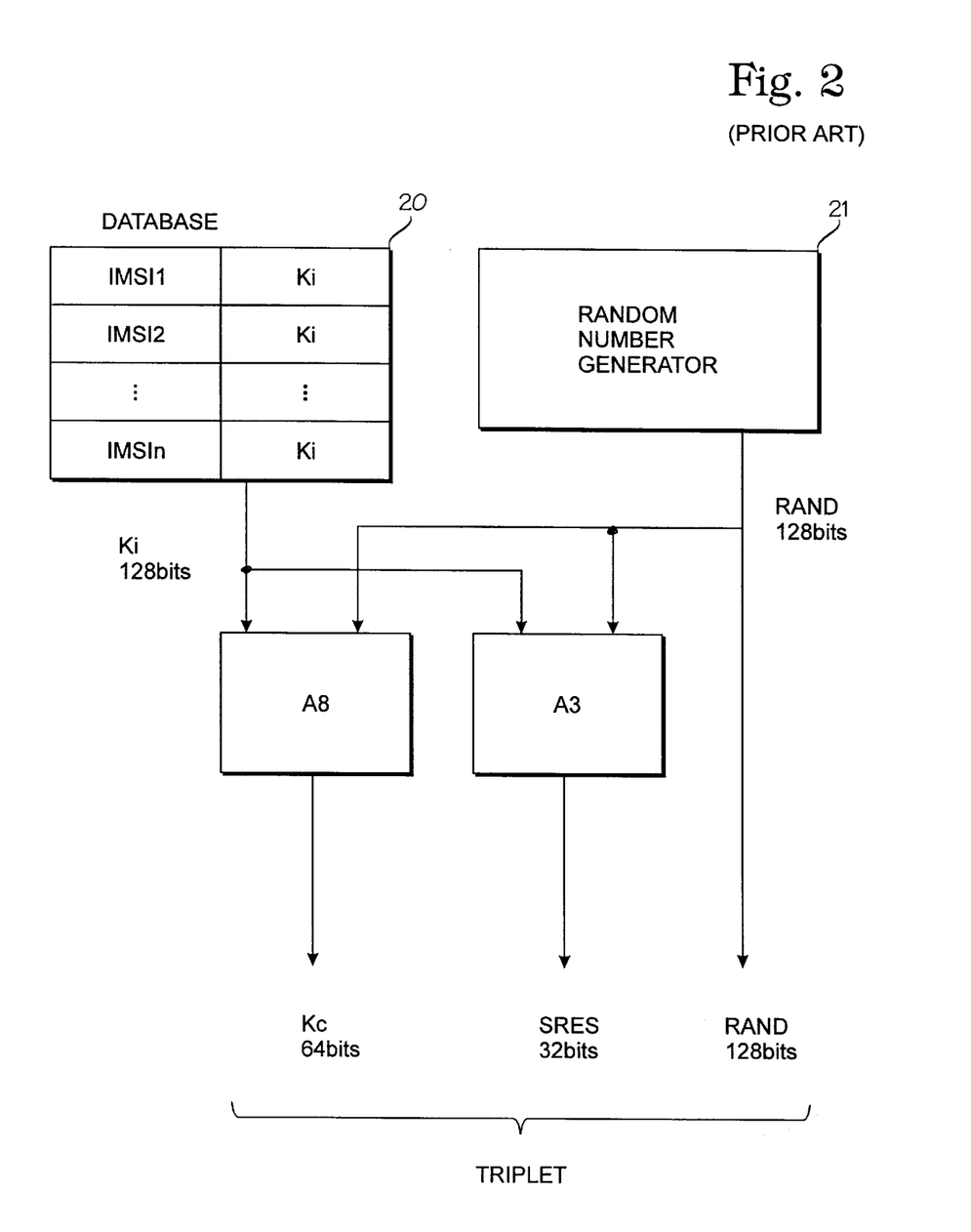
FIG. 2 is a functional block diagram of the prior art authentication and ciphering parameter processing unit in the authentication center AUC.

At subscription time, a secret number called a subscriber authentication key ($K_i$) is allocated to the mobile subscriber together with an international mobile subscriber identity (IMSI). As shown in FIG. 2, the authentication center AUC comprises a database 20 which stores the authentication key $K_i$ for each mobile subscriber in the GSM network. The $K_i$ of the mobile subscriber can be retrieved from the database 20 using the IMSI of the mobile subscriber as an index. The AUC is further provided with a ciphering algorithm A8, an authentication algorithm A3, and a random number generator 21. The random number generator 21 provides random numbers RAND having length of 128 bits. The key $K_i$ retrieved from database 20 and the random number RAND from the random number generator 21 are used as input parameters in the authentication algorithm A3 to calculate the signed response SRES, and as input parameters in the ciphering algorithm A8 to calculate the ciphering key $K_c$ for traffic channel encoding. The three parameters RAND, SRES and $K_c$ make up a triplet for a mobile subscriber.

The triplets will be transferred further to the visited MSC/VLR to be used for authentication and ciphering as will be explained in more detail below.

A triplet is used only once, for one communication, and is then destroyed. In order to avoid calculation and transfer of a triplet every time it is needed, several triplets are calculated in advance for each mobile subscriber by AUC/HLR and, on request, are delivered to the visited MSC/VLR, where they are stored.

Figure 4:
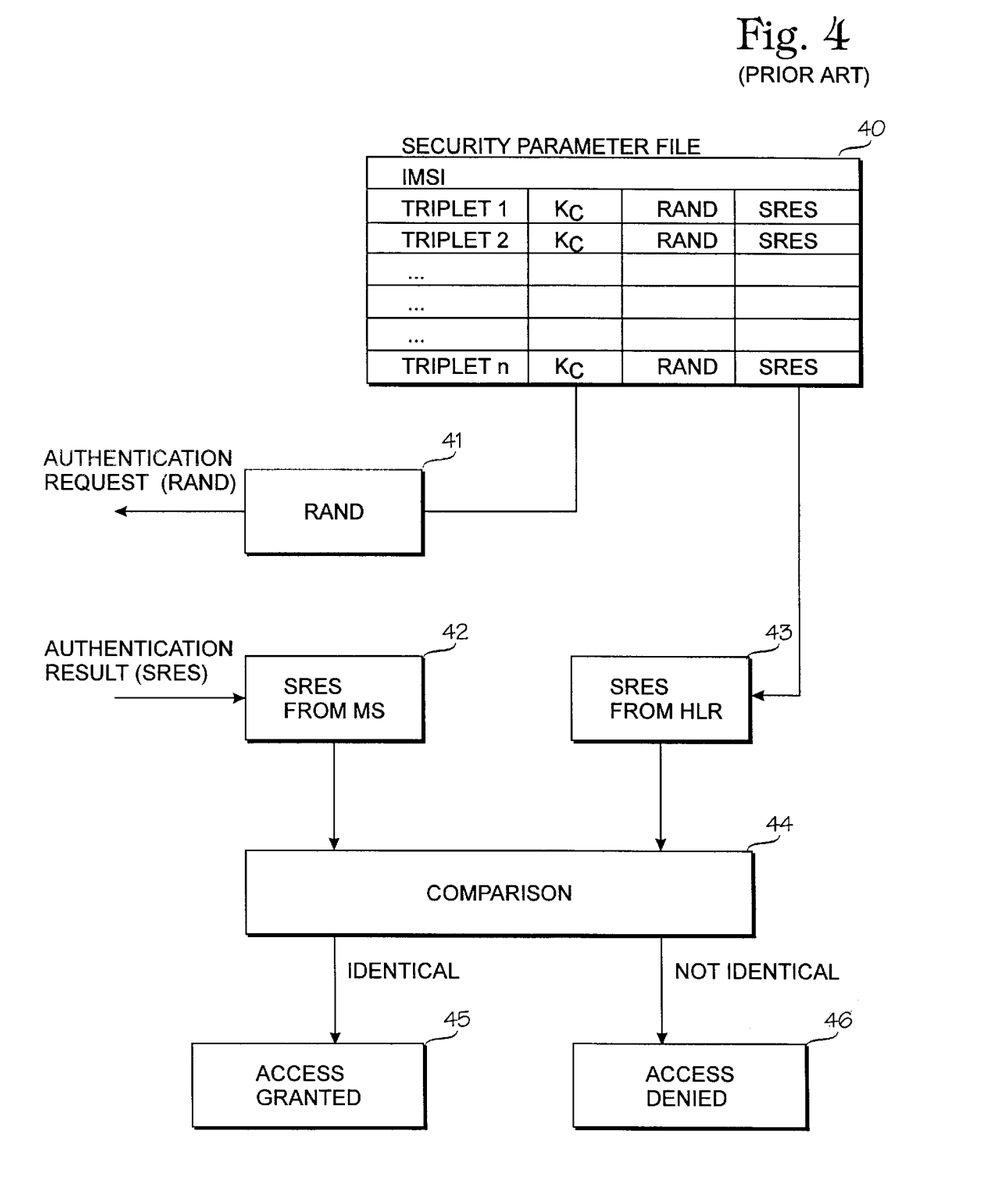
FIG. 4 is a functional block diagram of the the authentication and ciphering parameter processing unit in the MSC/VLR.

The visited MSC/VLR stores a reserve of a few of such triplets per subscriber to be retrieved when needed. Referring to FIG. 4, there is shown an example of a security parameter file 40 maintained in the visited MSC/VLR. The file 40 contains n triplets 1 . . . n for each IMSI (subscriber).

Figure 5:
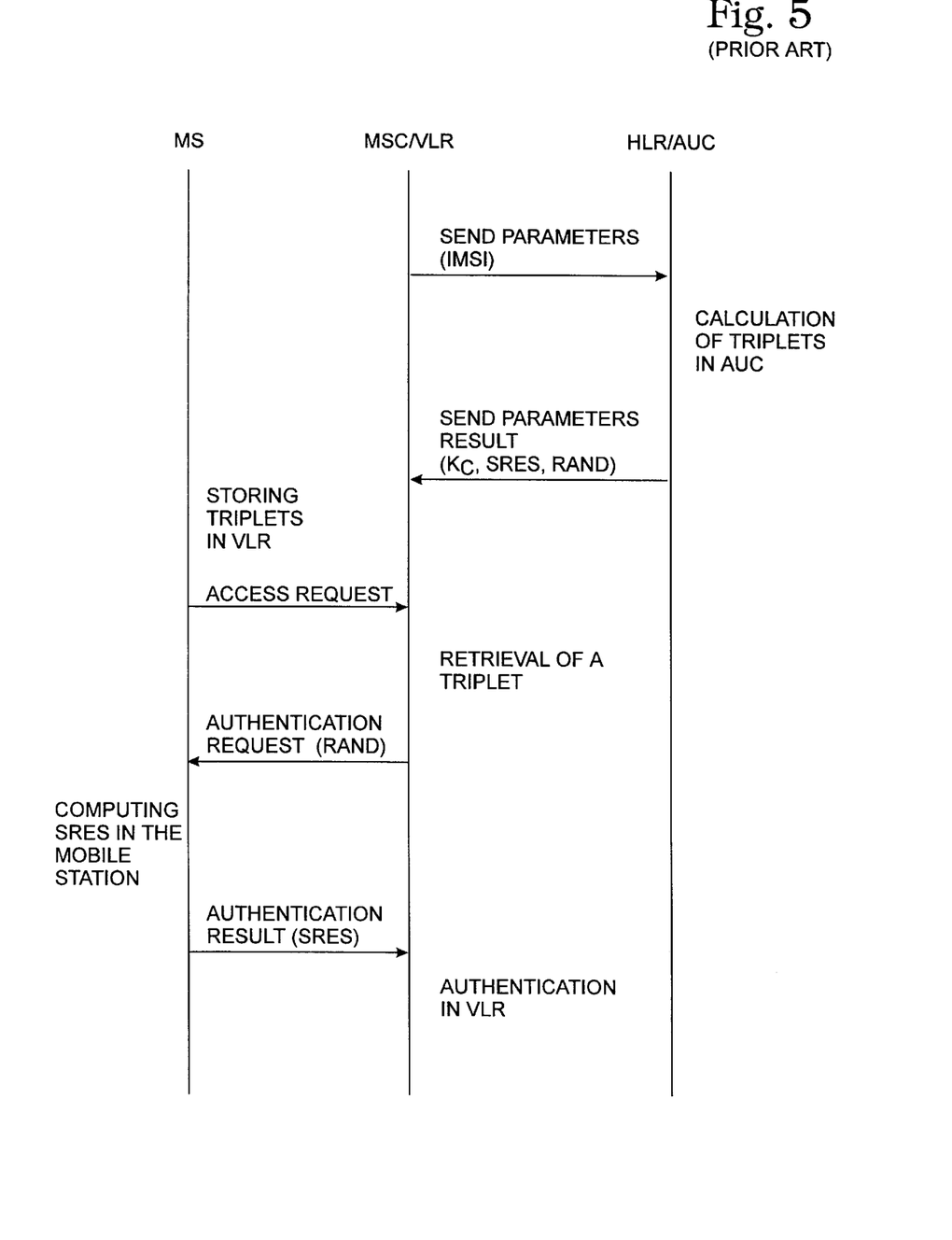
FIG. 5 illustrates the signalling related to the generation, transfer and use of the authentication and ciphering parameters.

This reserve in the security parameter file 40 is first established when the mobile subscriber first registers in the visited MSC/VLR: it is part of the subscriber data downloaded from the HLR in the INSERT SUBSCRIBER DATA message. When a subscriber has used all of its available triplets, the AUC/HLR is then requested to calculate and send back a new series. Referring to FIG. 5, this triplet-replenishing procedure consists of two messages: a SEND PARAMETERS message, and its answer, a SEND PARAMETERS RESULT message. The former message contains the IMSI of the mobile subscriber which is used to retrieve the $K_i$ for calculation of the triplets as described above with reference to FIG. 2. The calculated triplets will be delivered to the MSC/VLR in the SEND PARAMETERS RESULT message and stored in the VLR.

Referring further to FIG. 4, the mobile station MS sends an access request to the MSC/VLR. The MSC/VLR retrieves one of the triplets reserved for the subscriber of the mobile station MS in the security parameter file using the IMSI as an index. The MSC/VLR conveys, on one hand, the value of $K_c$ to the channel equipment in the BSC to be used in the traffic channel ciphering, and, on the other hand, the value of RAND to the MS in the AUTHENTICATION REQUEST message, as shown by block 41 in FIG. 4. On basis of the RAND, the mobile station MS calculates the other values of the triplet (SRES and $K_c$).

Figure 3:
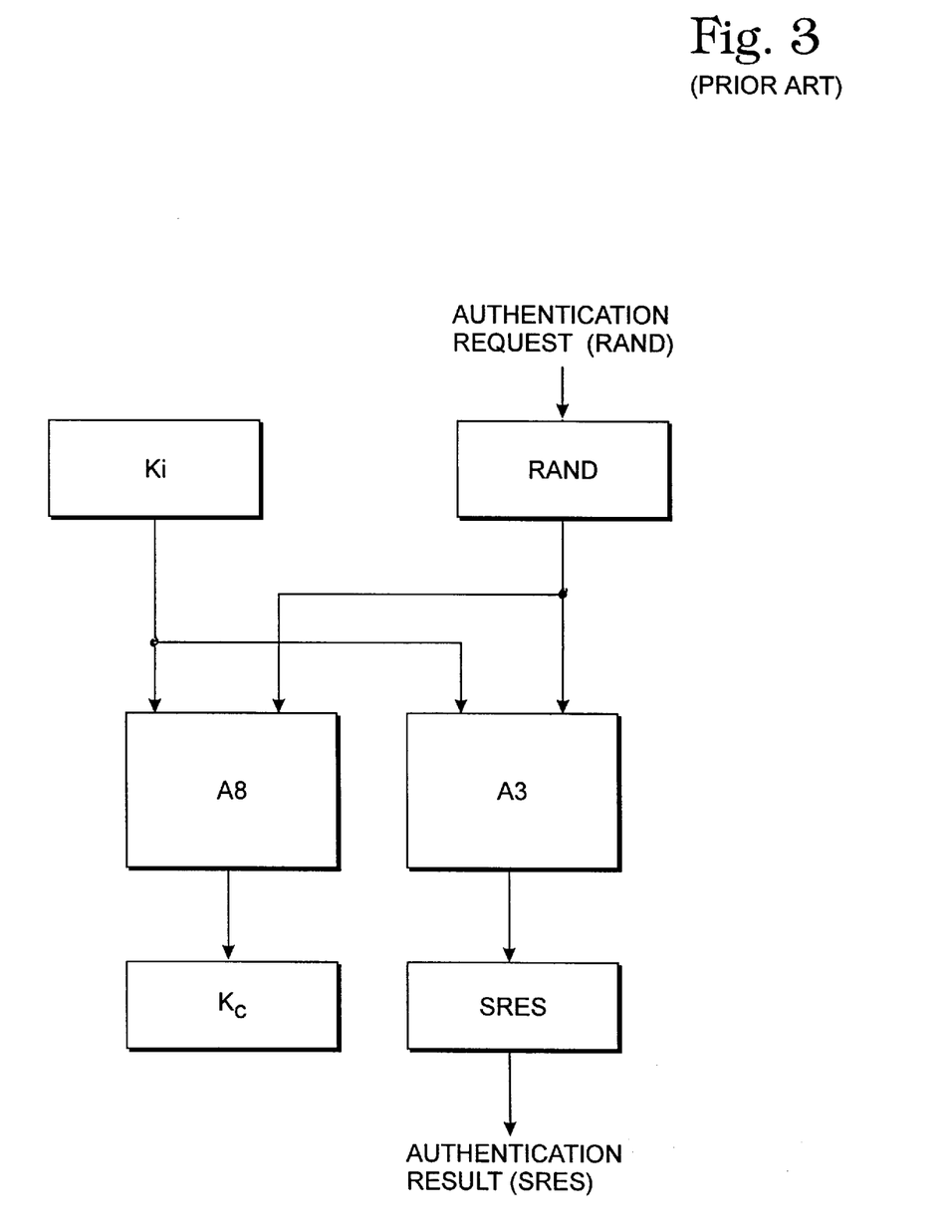
FIG. 3 is a functional block diagram of the prior art authentication and ciphering parameter processing unit in the mobile station MS.

Referring to FIG. 3, the MS stores a copy of the ciphering key $K_i$ of the mobile subscriber, as well as the ciphering algorithm A8 and the authentication algorithm A3. Upon receiving the AUTHENTICATION REQUEST message for the MSC/VLR, the MS extracts the RAND from the message, and then inputs the RAND and the stored $K_i$ to the algorithms A3 and A8, for, calculating the signed response SRES and the ciphering key $K_c$, respectively. The calculated SRES will be conveyed to the MSC/VLR in the AUTHENTICATION RESULT message for completing the authentication, as shown in FIGS. 4 and 5.

Referring to FIG. 4, the MSC/VLR extracts the value of SRES from the AUTHENTICATION RESULT message (block 42) and retrieves the stored value of SRES from the file 40 (block 43). Then, for this communication, prior to any other processing, the MSC/VLR "authenticates" the mobile subscriber by checking that the SRES calculated in the AUC/HLR is identical to the SRES calculated in the MS (block 44). If the two values are identical, the access is granted (block 45). If the two values are not identical, the access is denied (block 46).

The ciphering procedure is not relevant to the present invention and will not be described in more detail herein.

As noted in the foregoing summary section of this specification, there may be a need to use the CAVE algorithm as the authentication algorithm A3 in the USA in a digital cellular system called the Personal Communications System (PCS), or other in cellular systems based to a great extent on the GSM system, especially as regards network architecture and protocols, including the security functions. The CAVE algorithm has been developed in the USA, and the availability of the CAVE algorithm information is governed under the U.S. International Traffic and Arms Regulation (ITAR). However, the CAVE is already used in analog Advanced Mobile Phone Service (AMPS) networks and its input/output parameters are specified in EIA/TIA standard IS-54. The CAVE algorithm has a 152-bit input parameter consisting of a number of concanated information fields, and an 18-bit output parameter. Problems are, however, encountered in practical implementation of use of the CAVE algorithm as the authentication algorithm, due to the fact that the A3 algorithm in the GSM system has a 128-bit $K_i$ and RAND as input parameters, and a 32-bit SRES as an output parameter.

These problems will be overcome when, according to the present invention, an adaptation of the parameters is made at the input and output of the CAVE algorithm. As a result, no modifications are needed in the CAVE algorithm itself, nor it is necessary to depart from the GSM specifications elsewhere than in the calculation of the SRES in the AUC/HLR and the MS.

The preferred embodiments of the parameter adaptation according to the invention will now be described with reference to FIGS. 6 and 7.

Figure 6:
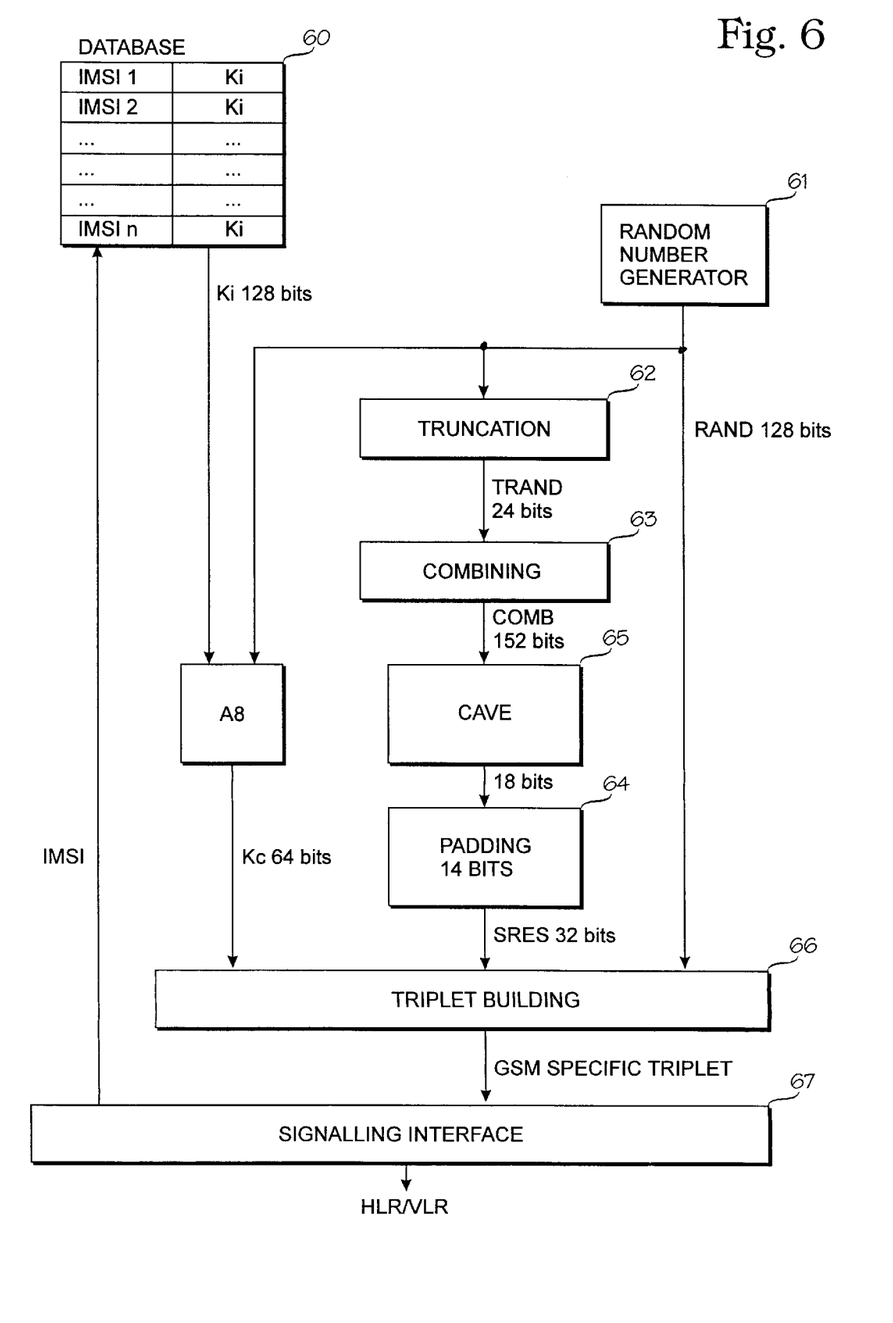
FIG. 6 is a functional block diagram of the authentication and ciphering parameter processing unit according to the invention in the authentication center AUC.

Referring now to FIG. 6, the authentication center AUC according to the invention comprises a database 60 and a random number generator 61 which are similar to the database 20 and generator 21 shown in FIG. 2. The database 60 stores the 128-bit authentication keys $K_i$ according to the GSM specifications for all mobile subscribers of the GSM network, indexed by the IMSIs. The IMSI by which the $K_i$ is selected for further calculation is received from a signalling interface 67 which receives it from the HLR or VLR, e.g. in a SEND PARAMETERS message. The random number generator 61 provides the 128-bit random numbers RAND in accordance with the GSM specifications.

The $K_i$ and RAND are inputs to the ciphering algorithm A8 which calculates the 64-bit ciphering key $K_c$ in accordance with the GSM specifications. In other words, the calculation of $K_c$ is identical to that described with reference to FIG. 2.

The 128-bit RAND is also an input to a truncation unit 62 which truncates the RAND into a 24-bit truncated RAND (TRAND). The TRAND may contain, for example, the 24 most significant bits of RAND. It should be appreciated, however, that the truncation operation as used herein is intended to cover any method to derive the 24-bit random number TRAND from the 128-bit random number RAND. It should be noted that although the length of $K_i$ is 128 bits in the preferred embodiment, it may have any length of N bits, where N is integer less than or equal to 128. Consequently, the length M of TRAND depends on N, being M=152−N bits.

The 24-bit TRAND is then inputted to a combining unit 63, the other input of unit 63 being the 128-bit authentication key $K_i$. The output of the combining unit 63 is a 152-bit combination (COMP) of the $K_i$ and the TRAND. The 128 most significant bits of the COMP may contain the $K_i$ and the 24 least significant bits may contain the TRAND. It should be appreciated, however, that the combination operation as used herein is intended to cover any method, e.g. a logical operation, to derive a 152-bit value by combining the $K_i$ and the TRAND.

The 152-bit COMP parameter meets the requirements set on the input parameter of the CAVE algorithm in the calculation unit 65. Thus, the parameter adaptation according to the invention derives a CAVE-compatible input parameter from the GSM compatible input parameters $K_i$ and RAND. As a result of the calculation, the CAVE calculation unit 65 outputs an 18-bit output parameter.

The 18-bit output parameter from the CAVE is then inputted to the padding unit 64 in which 14 stuff bits will be inserted so as to obtain a 32-bit value. The 14 stuff bits may establish, for example, the 14 least significant bits of the 32-bit parameter, the 18 most significant bits containing the 18-bit output from the CAVE calculation unit 65. It should be appreciated, however, that the padding operation as used herein is intended to cover any method, e.g. logical operation, to lengthen the 18-bit CAVE output parameter by 14 bits to obtain 32 bits.

The resulting 32-bit output parameter is then used as the signed response SRES according to the GSM specifications. Thus, the parameter adaptation according to the invention derives a GSM compatible output parameter from a CAVE compatible output parameter.

The three GSM compatible security parameters SRES, $K_c$ and RAND are inputted to a triplet building unit 66, in which a standard GSM triplet is built. The triplet is transferred to the HLR or VLR via the signalling interface 67. Thus, the SRES is transferred and processed in the GSM network in a similar manner to that used for a standard SRES.

Figure 7:
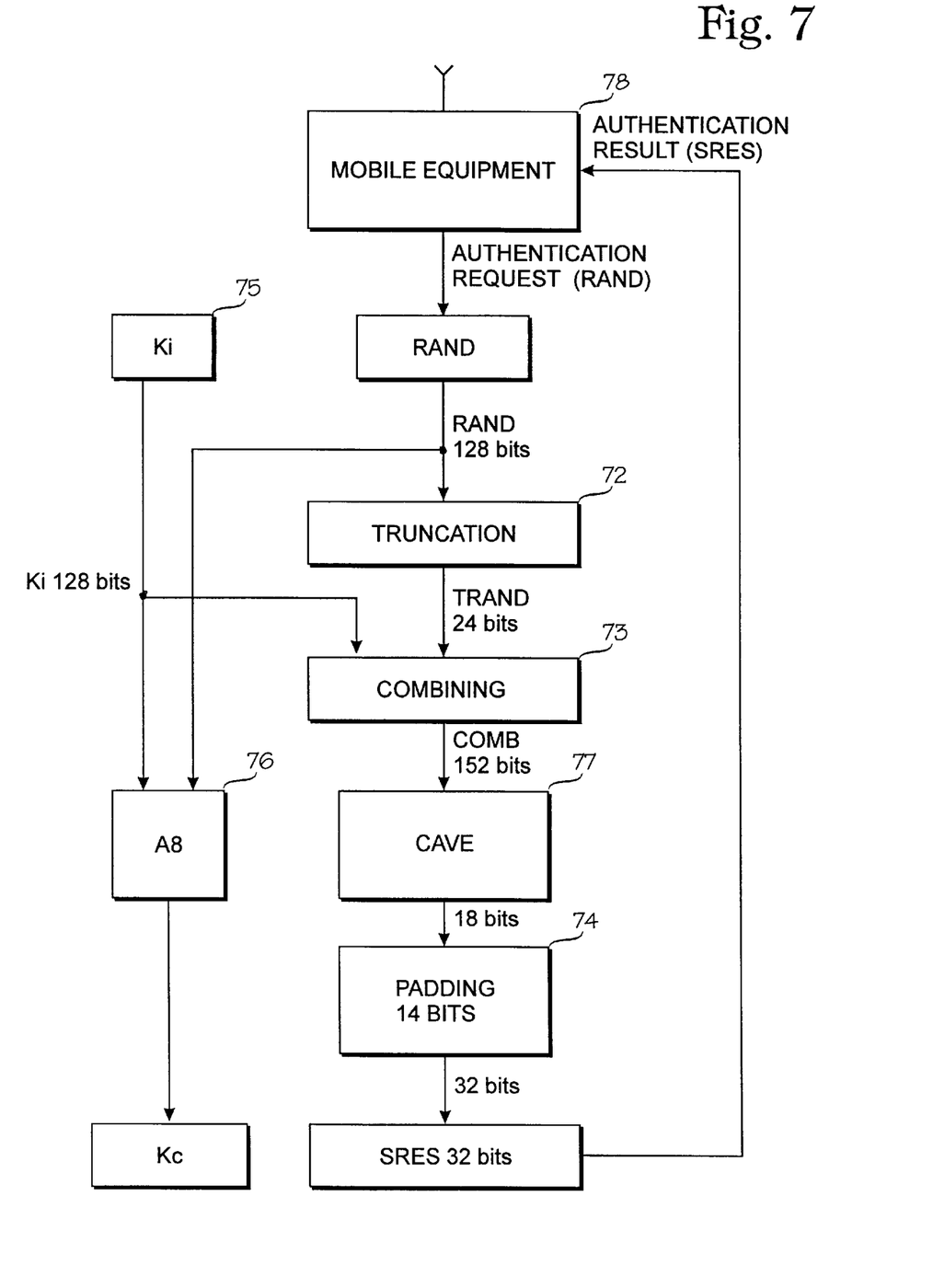
FIG. 7 is a functional block diagram of the authentication and ciphering parameter processing unit according to the invention in the mobile station MS.

Referring now to FIG. 7, the mobile station MS according to the invention stores a copy of the ciphering key $K_i$ of the mobile subscriber in a memory 75. The MS also comprises a calculation unit 76 carrying out the ciphering algorithm A8, and a calculation unit 77 carrying out the CAVE algorithm for authentication. Upon receiving the AUTHENTICATION REQUEST message from the MSC/VLR, the of the MS, which contains the hardware and software specific to the radio interface, the mobile equipment 78, extracts the RAND from the message, and then inputs the RAND and the stored $K_i$ to the A8 calculation unit 76 for calculation of the ciphering key $K_c$. In the preferred embodiment of the invention, all the functional blocks except 78 are located in the Subscriber Identity Module or SIM of the MS.

The 128-bit RAND is also an input to a truncation unit 72 which truncates the RAND into a 24-bit TRAND. The truncation unit 72 is identical to the truncation unit 62 shown in FIG. 6.

The 24-bit TRAND is then inputted to a combining unit 73, together with the 128-bit $K_i$. The output of the combining unit 73 is a 152-bit COMP. The combining unit 73 is identical to the combining unit 63 shown in FIG. 6.

The 152-bit COMP is then inputted to the CAVE calculation unit 77 which outputs an 18-bit output parameter.

The 18-bit output parameter from the CAVE 77 is inputted to a padding unit 74, in which 14 stuff bits are attached so as to provide a 32-bit value. The padding unit 74 is identical to the padding unit 64 shown in FIG. 6.

The resulting 32-bit output parameter is then used as the SRES parameter according to the GSM specifications. The SRES is then returned to the mobile equipment 78 and sent further to the MSC/VLR in the AUTHENTICATION RESULT message, and processed in the MSC/VLR as in the standard GSM system.

Figure 8:
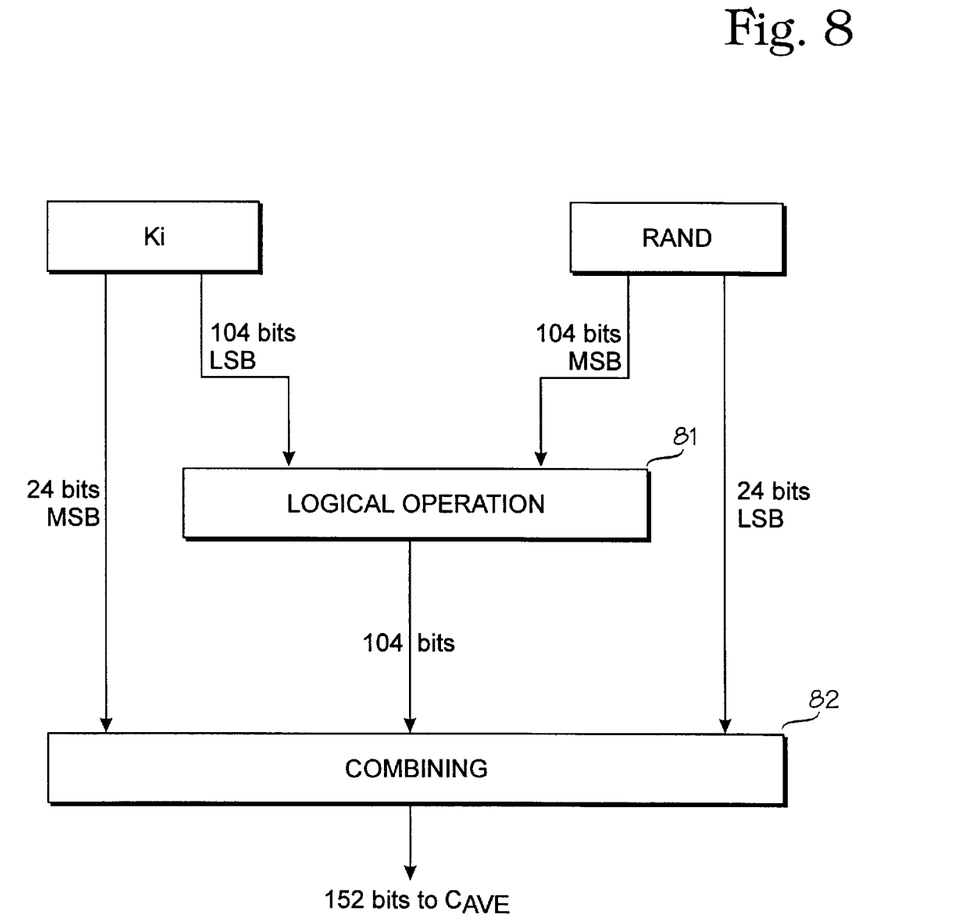
FIG. 8 is a schematic diagram of an alternative embodiment for deriving a 152-bit CAVE input parameter from N-bit $K_1$ and RAND parameters.

An example of alternative embodiments for deriving the 152-bit CAVE input parameter from the N-bit $K_i$ and RAND parameters is shown in FIG. 8. In the following examples N=128 but N may be any positive integer in these embodiments. $K_i$ is divided into two parts: 104 bits of the $K_i$, e.g. 104 least significant bits (LSB), are inputted to an input of a logical unit 81. The remaining 24 bits of $K_i$ are inputted to a combiner 82. Similarly, RAND will be divided into two parts: 104 bits of the RAND, e.g. 104 most significant bits (MSB), are inputted to the logical unit 81. The remaining 24 bits of RAND are inputted to another input of the combiner 82. A logical operation, such as AND, OR, or exclusive OR (XOR), is performed between the two 104-bit inputs, and a single 104-bit output is provided. The 104-bit output from the logical unit 81 is inputted to the combiner 82. The combiner 82 assembles the two 24-bit inputs and the 104-bit input into a 152-bit parameter to be inputted to the CAVE algorithm. When applied in the authenticatication center of FIG. 6 and in the mobile station of FIG. 7, the logical unit 81 and the combiner 82 substitute for the truncation unit 62, 72 and the combiner 63, 73, respectively.

As a further modification to the embodiment of the FIG. 8, the 104 bits of $K_i$ and the 104 bits of RAND may be subdivided into equal numbers of subblocks, and different logical operations performed between different subblocks. There may be four subsblocks of 26 bits, for example.

The drawings and the associated description are solely intended to illustrate the present invention. Changes and modifications will apparent to a skilled person in the art without departing from the scope and spirit of the attached claims.

I claim:

1. An authentication center for a mobile communications network, comprising
   a database storing an authentication key for each subscriber of said mobile communications network as a first input parameter for calculation of a ciphering key and an authentication response parameter in a first format required by a given first authentication procedure, a source for providing a random number as a second input parameter for calculation of said ciphering key and said authentication response parameter in said first format, an encryption key calculation unit arranged for having an authentication key provided from said database and a random number provided from said source of random numbers, respectively as first and second input parameters thereto, and for outputting a ciphering key which is in said first format, an authentication response parameter-calculation unit requiring a single input parameter for outputting an authentication response parameter which is in a second format which is different from said first format, a first adaptation unit responsive to input thereto of an authentication key from said database and a random number from said source, as input parameters, for providing said single input parameter to said authentication response parameter-calculation unit, and a second adaptation unit responsive to input thereto of said authentication response parameter outputted by said authentication response parameter-calculation unit, for providing said authentication response parameter according to said first authentication procedure.

2. An authentication parameter processing unit in a mobile station, comprising a memory storing an authentication key for a mobile subscriber using said mobile station as a first input parameter for calculation of a ciphering key and an authentication response parameter in a first format required by a given, first authentication procedure, a source for providing a random number as a second input parameter for calculation of said ciphering key and said authentication response parameter in said first format, an encryption key calculation unit arranged for having an authentication key provided from said database and a random number provided from said source of random numbers, respectively as first and second input parameters thereto, and for outputting a ciphering key which is in said first format, an authentication response parameter calculation unit requiring a single input parameter for outputting an authentication response parameter which is in a second format which is different from said first format, a first adaptation unit responsive to input thereto of an authentication key from said database and a random number from said source, as input parameters, for providing said single input parameter to said authentication response parameter-calculation unit, and a second adaptation unit responsive to input thereto of said authentication response parameter outputted by said authentication response parameter-calculation unit, for providing said authentication response parameter according to said first authentication procedure.

3. An authentication method for a mobile communications network, a given authentication procedure having a given authentication response format comprising the steps of:

providing an authentication key compatible with a given first authentication response-calculation method but incompatible with a second authentication response-calculation method, for each subscriber of said mobile communications network, generating a random number compatible with said first authentication response-calculation method but incompatible with said second authentication response-calculation method, deriving an input parameter compatible with said second authentication response calculation method from said authentication key and said random number, calculating, by using said second authentication response-calculation method, an authentication response having a format which is incompatible with said given authentication response format of said given authentication procedure utilized in said mobile communications network, modifying said authentication response into modified authentication response having a format compatible with said given authentication response format of said given authentication procedure, and transferring and storing said modified authentication response in said mobile communications network.

* * * * *